(12) United States Patent
Huza

(10) Patent No.: US 7,993,437 B2
(45) Date of Patent: Aug. 9, 2011

(54) FILTER REMOVAL BAG

(75) Inventor: Mark Huza, Columbia, MD (US)

(73) Assignee: Camfil Farr, Inc., Riverdale, NJ (US)

( * ) Notice: Subject to any disclaimer, the term of this patent is extended or adjusted under 35 U.S.C. 154(b) by 368 days.

(21) Appl. No.: 11/613,635

(22) Filed: Dec. 20, 2006

(65) Prior Publication Data

US 2008/0078149 A1  Apr. 3, 2008

Related U.S. Application Data

(63) Continuation-in-part of application No. 11/538,194, filed on Oct. 3, 2006, now Pat. No. 7,618,483.

(60) Provisional application No. 60/829,666, filed on Oct. 16, 2006.

(51) Int. Cl.
*B01D 46/00* (2006.01)

(52) U.S. Cl. ............... 96/414; 96/417; 55/367; 55/370; 55/381; 55/481; 55/466; 55/385.2; 383/8; 383/61.4; 383/72; 312/1

(58) Field of Classification Search ........... 55/385.2, 55/429, 432, 385.1, 467, 480, 481, 506, DIG. 34; 96/136, 138, 139, 224, 414, 421, 417, 415, 96/416; 454/187; 206/525, 527, 315.91, 206/599; 383/8, 61.4, 102, 206, 40, 15, 72, 383/74; 312/1, 3; 313/3; 224/42.39, 578, 224/579; 150/107

See application file for complete search history.

(56) References Cited

U.S. PATENT DOCUMENTS

| | | | | |
|---|---|---|---|---|
| 2,151,523 | A | * | 3/1939 | Orr .................... 383/206 |
| 2,732,111 | A | * | 1/1956 | Fogle ................ 224/602 |
| 2,742,105 | A | | 4/1956 | Dow |
| 3,265,286 | A | * | 8/1966 | Etsuo ............... 383/206 |
| 3,301,687 | A | * | 1/1967 | Davy ............... 426/113 |
| 3,354,616 | A | | 11/1967 | Lucas |
| 3,402,530 | A | | 9/1968 | Agnon |
| 3,635,001 | A | * | 1/1972 | Komroff et al. ............ 96/417 |
| 3,745,965 | A | | 7/1973 | Ljung et al. |
| 3,746,066 | A | * | 7/1973 | McIntyre ............ 150/107 |
| 3,857,139 | A | * | 12/1974 | Turner ............ 24/30.5 T |
| 3,973,294 | A | * | 8/1976 | Pfizenmaier ........ 24/30.5 T |
| 4,247,005 | A | * | 1/1981 | Buxton ............... 206/525 |

(Continued)

OTHER PUBLICATIONS

"Pharmaseal", Product sheet 3420-0704, Camfil Farr, Inc., Washington, NC, © Camfil Farr, Date Unknown, Feb. 12, 2007.

(Continued)

*Primary Examiner* — Duane Smith
*Assistant Examiner* — Minh-Chau T Pham
(74) *Attorney, Agent, or Firm* — Patterson & Sheridan, LLP

(57) ABSTRACT

Embodiments of the invention generally include a contamination housing assembly and bag for use therein. In one embodiment, a contamination housing assembly includes a housing having an inlet, outlet, and access port. A bagging ring is coupled to the housing and circumscribes the port. A door is provided for covering the port. A bag indicator is coupled to at least one of the containment housing or door and is visible, when in a first position, from an exterior of the containment housing when the door substantially covers the bagging ring. In yet another embodiment, a bag for use with a containment housing is provided. The bag has an open end configured to engage with a bagging ring. The bag includes at least one of a strap or a RF readable tag.

24 Claims, 7 Drawing Sheets

U.S. PATENT DOCUMENTS

| | | | |
|---|---|---|---|
| 4,267,868 A * | 5/1981 | Lowe | 383/2 |
| 4,334,896 A | 6/1982 | Müller | |
| 4,450,964 A * | 5/1984 | Wood | 206/527 |
| 4,521,234 A * | 6/1985 | Peebles et al. | 55/481 |
| 4,878,764 A * | 11/1989 | Meyer | 383/72 |
| 5,156,662 A * | 10/1992 | Downing et al. | 55/493 |
| 5,674,381 A * | 10/1997 | Den Dekker | 210/85 |
| 5,837,040 A * | 11/1998 | Caughron et al. | 96/224 |
| 5,907,886 A | 6/1999 | Buscher | |
| 6,142,192 A * | 11/2000 | Dickinson et al. | 141/97 |
| 6,149,699 A * | 11/2000 | Grantham | 55/385.2 |
| 6,287,002 B1 * | 9/2001 | Sherman et al. | 383/74 |
| 6,435,391 B1 * | 8/2002 | Vazquez | 224/656 |
| 6,878,266 B2 * | 4/2005 | Leaverton | 210/167.12 |
| 6,939,042 B2 * | 9/2005 | Rusnak et al. | 383/71 |
| 6,979,361 B2 * | 12/2005 | Mihayiov et al. | 96/26 |
| 7,001,451 B2 * | 2/2006 | Kim | 96/415 |
| 7,104,201 B2 * | 9/2006 | Comeaux et al. | 108/90 |
| 7,387,654 B1 * | 6/2008 | Byers | 55/385.1 |
| 2004/0114836 A1 * | 6/2004 | LeClaire | 383/93 |
| 2004/0156564 A1 * | 8/2004 | Glasser | 383/72 |
| 2006/0126969 A1 * | 6/2006 | Paller | 383/38 |
| 2007/0240578 A1 * | 10/2007 | DiLeo | 96/417 |
| 2008/0212902 A1 * | 9/2008 | Montgomery | 383/2 |
| 2009/0014603 A1 * | 1/2009 | Zima | 248/101 |
| 2009/0074332 A1 * | 3/2009 | Bonke | 383/33 |
| 2010/0126902 A1 * | 5/2010 | Garza et al. | 206/579 |

OTHER PUBLICATIONS

International Search Report and Written Opinion for PCT/US 06/62679 dated Dec. 5, 2007.

* cited by examiner

FILTER REMOVAL BAG

CROSS REFERENCE TO RELATED APPLICATIONS

This application is a continuation-in-part of U.S. patent application Ser. No. 11/538,194, filed Oct. 3, 2006 now U.S. Pat. No. 7,618,483, which is incorporated by reference in its entirety.

This application also claims benefit of U.S. Provisional Patent Application Ser. No. 60/829,666, filed Oct. 16, 2006, which is incorporated by reference in its entirety.

BACKGROUND OF THE INVENTION

1. Field of the Invention

The present invention generally relates to a filter housing assembly having a bagging ring, and more specifically, a filter housing assembly for an air filter having a ring for bag-in/bag-out filter replacement.

2. Description of the Related Art

Contamination housing assemblies are used in critical processes where hazardous airborne materials must be prevented from escaping to the atmosphere. A filter is disposed in the contamination housing assembly to remove the hazardous and other materials from the air stream passing through the housing assembly. The housing assembly may be configured to include at least one filter, such as a particulate filter, a HEPA filter, and/or molecular filters for absorbing molecular contaminants.

The filters disposed in the contamination housing assembly are periodically replaced using a control barrier to protect change-out personnel from contaminants within the housing and from contaminants captured by the filters. The typical control barrier utilized is a plastic bag enclosure system such as described in U.S. Pat. No. 3,354,616, issued Nov. 28, 1967. The portion of the housing that facilitates the use of a plastic bag to remove and replace filters from a contamination housing assembly is typically known as a Bag-In/Bag-Out (BIBO) feature.

The BIBO feature consists of a bagging ring, which is generally some type of flange that extends perpendicular from the face of the containment housing around the perimeter of the opening where the filter is installed. This ring often has grooves or channels formed into it. A bag, manufactured from PVC or other suitable material has an opening containing an elastic cord or O-ring that is capable of stretching sufficiently to slide over the outside circumference of the bagging ring. The cord fits securely against the bagging ring and keeps the bag attached to the containment housing. The bag essentially forms a boundary between the contaminated interior of the containment housing and personnel performing service work on the exterior of the housing. After a filter is initially installed in the containment housing, before the system is put into beneficial operation, the bag is installed. The bag is then neatly folded and stored in the cavity created by the bagging ring. The access door is then installed to seal the opening circumscribed by the bagging ring.

In many applications, the interior of the containment housings and the filters installed in the containment housings are exposed to microorganisms, bacteria, viruses, or other contaminants that are hazardous or potentially fatal to humans. Before filters are serviced or replaced in such applications, it is common to "decontaminate" the filter and the containment housing prior to removing the access door. This decontamination is conducted by closing the bubble-tight dampers located upstream and downstream of the filter and then connecting a decontamination system to valves located on the containment system upstream and downstream of the filter. Once connected to the decontamination system, the valves are opened and a sterilization agent is circulated through the housing, in a closed loop system, at a given concentration and duration that is suitable for killing the organism on the filter and inside of the housing. There are several chemical agents that are used for decontamination including vaporized hydrogen peroxide (VHP), formaldehyde, ethylene oxide and chlorine dioxide. Decontamination is not effective on all microorganisms and bacteria. For instance, prions are not "killed" or effectively deactivated through the use of such decontamination agents. Therefore, if prions are present in a contaminated system, personnel servicing the containment system or filter are still at risk when exposed to the interior of the containment housing and filter even after the system has been decontaminated.

In those applications where organisms are not effectively eliminated or the type of organisms present in a system is of great concern in regard to human health and safety, it is essential that the bag previously described is installed prior to initial startup of the system. With the bag installed, personnel may remove the access door from the housing during servicing without direct exposure to the interior of the housing. If the bag is not installed, personnel are exposed to the interior of the housing when the access door is removed. If contaminants such as prions are present, personnel are directly exposed to the contaminant. With an increase in the number of facilities installing containment systems and a growing lack of trained and experienced personnel, the risk to human health and safety is increasing, particularly in an exhaust application where the system has been operational and contaminated with microorganisms, bacteria, viruses, or other contaminants that are harmful and potentially fatal to humans.

Thus, there is a need for a housing having a safeguard relating to the presence of a bag installed in the housing.

The center portion of the installed bag is typically rolled, folded or otherwise collapsed and stored in aperture bounded by the bagging ring while the door of the housing is closed. Upon opening the door, the center portion may unroll and drop from the housing. The dropping center portion of the bag may hit and damage equipment, hit service technicians or damage the integrity of the bag.

Thus, there is a need for a bag having means for securing its center portion when the bag is installed in a contamination housing.

SUMMARY OF THE INVENTION

Embodiments of the invention generally include a contamination housing assembly and bag for use therein. In one embodiment, a contamination housing assembly includes a containment housing having an inlet, outlet, and access port. A bagging ring is coupled to the housing and circumscribes the access port. A door is provided having a closed position covering the access port. A bag indicator is coupled to at least one of the containment housing or door. The bag indicator is visible, when in a first position, from an exterior of the containment housing when the door substantially covers the bagging ring.

In another embodiment, a contamination housing assembly includes a housing having an inlet, outlet, and access port. A bagging ring is coupled to the housing and circumscribes the access port. A bag indicator is coupled to the containment housing and is movable between a first position away from the bagging ring and a second position closer the bagging ring.

The bag indicator interferes with mounting the door to the housing when the bag indicator is in the first position.

In another embodiment, a contamination housing assembly includes a housing having an inlet, outlet, and filter access port. A door selectively seals the filter access port. A bagging ring is coupled to the housing and circumscribes the filter access port. A means for sealing a filter within the housing is provided such that a flow from the inlet to the outlet passes through the filter. A bag presence indicator is coupled to at least one of the door or housing.

In yet another embodiment, a bag for use with a containment housing is provided. In one embodiment, a bag for use with a containment housing includes a polymer bag having an open end configured to engage with a bagging ring of a containment housing and a strap having a first end coupled to the bag without compromising contamination barrier integrity of the bag. In another embodiment, a bag for use with a containment housing includes a polymer bag having an open end configured to engage with a bagging ring of a containment housing and a RF readable tag coupled to the bag without compromising contamination barrier integrity of the bag.

In yet another aspect of the invention, a system in which a containment housing is installed will not operate and/or provide a flag if a bag is not installed in the containment housing.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures. It is contemplated that elements and features of one embodiment may be beneficially incorporated in other embodiments without further recitation.

It is to be noted, however, that the appended drawings illustrate only exemplary embodiments of this invention and are therefore not to be considered limiting of its scope, for the invention may admit to other equally effective embodiments.

DETAILED DESCRIPTION

Figure 1:
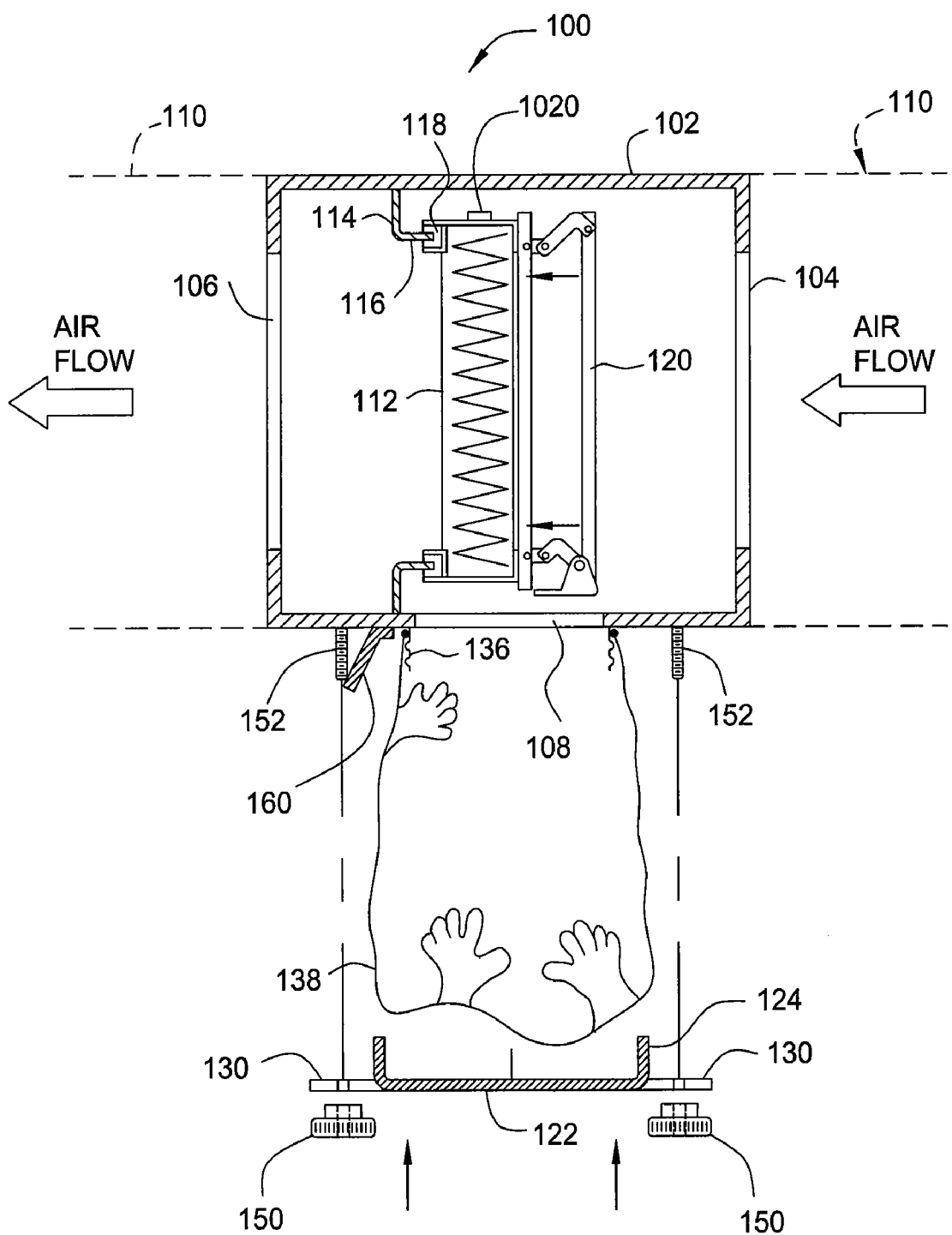
FIG. 1 is a cross-sectional view of one embodiment of a contamination housing.

FIG. 1 is a sectional view of one embodiment of a containment housing assembly 100. The containment housing assembly 100 is generally suitable for use to provide protection from hazardous agents generated by biomedical, pharmaceutical and nuclear processes that dictate the use of advanced air filtration devices to protect research samples, equipment, the environment and people. The containment housing assembly 100 is also suitable for use in health care applications to stem the spread of infectious diseases, among other applications where containment of hazardous agents is desirable.

The housing assembly 100 generally includes a containment housing 102 having an inlet 104, an outlet 106 and an access port 108. The inlet 104 and outlet 106 are formed through the housing 102 and allow gases flowing through a duct 110, shown in phantom in FIG. 1, to pass through the housing 102. The access port 108 is configured to permit access to the interior of the housing 102, for example, for filter change-out, scanning a filter disposed in an adjacently coupled housing, and the like. A bagging ring 136 extends from the housing 102 and circumscribes the access port 108, as further described below. The bagging ring 136 is utilized to retain a bag 138 over the access port 108 to facilitate filter replacement using a bag-in/bag out procedure.

The housing 102 may be fabricated from a metal, such as aluminum, steel and stainless steel, or other suitable material. The housing 102 has a construction that forms a pressure barrier between gases flowing therethrough and an environment outside the housing 102. In the embodiment depicted in FIG. 1, the housing 102 is a hollow rectangular body fabricated from continuously welded metal sheets.

The housing 102 additionally includes an internal flange 114 that sealingly engages a filter 112 disposed in the housing assembly 100. In the embodiment depicted in FIG. 1, the flange 102 includes a knife edge 116 that sealingly engages a fluid seal 118 disposed in a frame of the filter 112. The seal between the housing 102 and filter 112 forces air traveling through the housing 102 to pass through the filter 112. A linkage mechanism 120 is provided in the housing 102 and is configured to move the filter 112 between a position sealingly engaged with the flange 114 and a position clear of the flange 114.

The filter 112 may be a pleated panel, deep pleat (having a pleat height greater than about 2 inches), multi-v or bag filter for final stage or prefiltration. The filter 112 may be configured to remove particulate and/or gas phase contaminants from the gas stream passing through the filter.

The access port 108 is configured to facilitate removal of the filter 112 from the housing 102 and is selectively sealed by a door 122. The door 122 may be coupled to the housing 102 by a hinge (not shown). Alternatively, the door 122 may be removable from the housing 102. The door 122 includes a seal 124 that engages a face of the housing 102 when the door 122 is in a closed position, thus sealing the access port 108.

A clamp 132 is provided to secure the door 122 when in a closed position. In the embodiment depicted in FIG. 1, the clamp 132 is a knob 150 disposed on a threaded stud 152. The clamp 132 is adapted to selectively engage a locking tab 130 extending from the door 122. With the door 122 in the closed position, the knob of the clamp 132 may be positioned to engage a locking tab 130 extending from the door 122, such that the seal 124 may be compressed against the face 126 of the housing 102, for example, by tightening the knob 150 on the threaded stud 152.

One or more indicators 160 are coupled to the housing and provide at least one of a visual or mechanical indication that the bag 138 is coupled to the housing. In the embodiment depicted in FIG. 1, the indicator 160 is biased to a first position when the door 122 is removed from the housing 102. In the first position, the indicator 160 may be seen beyond the door 122 with the door at least partially or fully mounted to the housing 102, thereby providing a visual indication from the exterior of the housing 102 that the bag 138 may not be installed. Upon confirmation that the bag 138 is installed, the indicator 160 may be moved to a second position inward of the flange of the door 122, such that the indicator 160 is hidden from view.

In another embodiment, the indicator 160 may provide a mechanical means for preventing the door 122 from closing when in the first position. For example, the first position of the indicator 160 may interfere with the closing and/or clamping of the door 122. In the embodiment depicted in FIG. 1, the indicator 160 touches the stud 152 when in the first position, thereby preventing the door 122 from seating against the housing 102, and thus preventing the knob 150 from being threaded on the stud 152.

Figure 2:
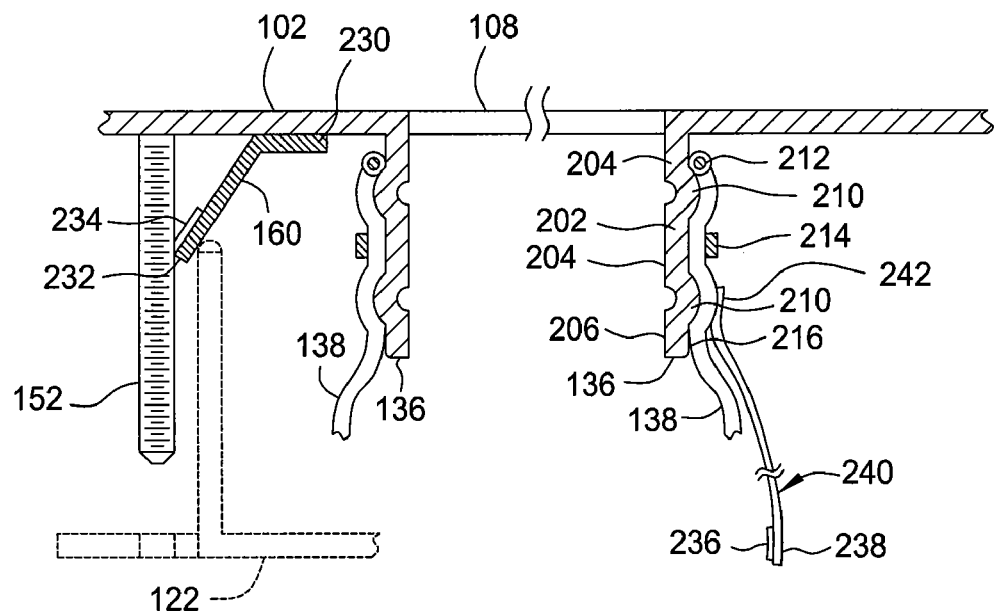
FIG. 2 is a partial sectional view of the contamination housing of FIG. 1 detailing a bagging ring to bag interface.

FIG. 2 is a partial sectional view of the housing 102 illustrating the interface between bagging ring 136 to bag 138, along with the indicator 160. The bagging ring 136 is generally a member 202 having a substantially perpendicular orientation to the housing 102. The member 202 may be fabricated from a material similar to, or the same as the housing 102. A first end 204 of the member 202 is sealed to the housing 202 to prevent leakage therebetween. In one embodiment, the first end 204 is continuously welded to the housing 202. A second end 206 of the member 202 may include a fold or hem (not shown) to prevent damage to the bag 138.

The member 202 may additionally include a plurality of ribs 210. In one embodiment, the ribs 210 are disposed on an outside 216 of the member 202, and extend in the direction away from the access port 108. It is also contemplated that one or more grooves may be formed in the member 202 in addition to, or in place of, the ribs 210.

The ribs 210 facilitate coupling the bag 138 to the bagging ring 136. For example, the open end of the bag 138 may include an elastic cord 212 which is stretched over the bagging ring 136 when the bag 138 is engaged with the housing assembly 100. The elastic cord 212 urges the bag 138 against the member 202 and is retained by the rib 210 from sliding off the second end 206 of the bagging ring 136.

A band 214 may be strapped over the bag 138 and drawn tight to further secure the bag 138 to the bagging ring 136. In one embodiment, the band 214 is disposed between two ribs 210 of the ring such that the bag 138 is substantially secured to the bagging ring 136.

To provide adhesion and/or a seal between the bag 138 and bagging ring 136, at least the outside 216 of the member 202 may be coated and/or fabricated with a material that has a property that improves the adhesion and/or provides a seal between the bag 138 and bagging ring 136. For example, the outside 216 of the member 202 may include a coating that improves the adhesion properties, such as adhesion, tackiness, static attraction and the like, as compared to conventional uncoated or painted steel bagging rings. The coating may optionally be applied to the inside 222 of the member 202 and/or portions of the housing 202. In one embodiment, the coating is a polymer film. In another embodiment, the coating is an adhesive. In another embodiment, the coating is a tacky material. In yet another embodiment, the coating is a material statically attractive to a polymer bag (e.g., the bag 138).

The indicator 160 is coupled to the housing 102 just outward of the bagging ring 136. A first end 230 of the indicator 160 may be coupled to housing 102 by adhesives, rivets, welding, fasteners or by other methods that do not comprise the leak integrity of the housing 102. The indicator 160 may be fabricated from a resilient material that biases a second end 232 of the indicator 160 away from the bagging ring 136. In one embodiment, the indicator 160 is fabricated from a spring steel.

In one embodiment, the second end 232 of the indicator 160 includes an engagement feature 234. The engagement feature 234 is configured to engage an engagement feature 236 coupled to a distal end 238 of a strap 240. The engagement features 234, 236 may be a hook and loop arrangement (for example, VELCRO®), magnet, interlocking geometry, latch, or other arrangement that holds the strap 240 to the indicator 160. The first end 242 of the strap 240 is coupled to the bag 136, for example, by a sealed stitch, adhesive, bond or sonic weld. The strap 240 may be utilized to hold the center portion of the bag 138 within the ring 136 and to hold the indicator 160 in the second position clear of the door 122. The distal end of the strap 240 may also be clamped to the housing and or indicator to retain the bag within the bagging ring.

Figure 3:
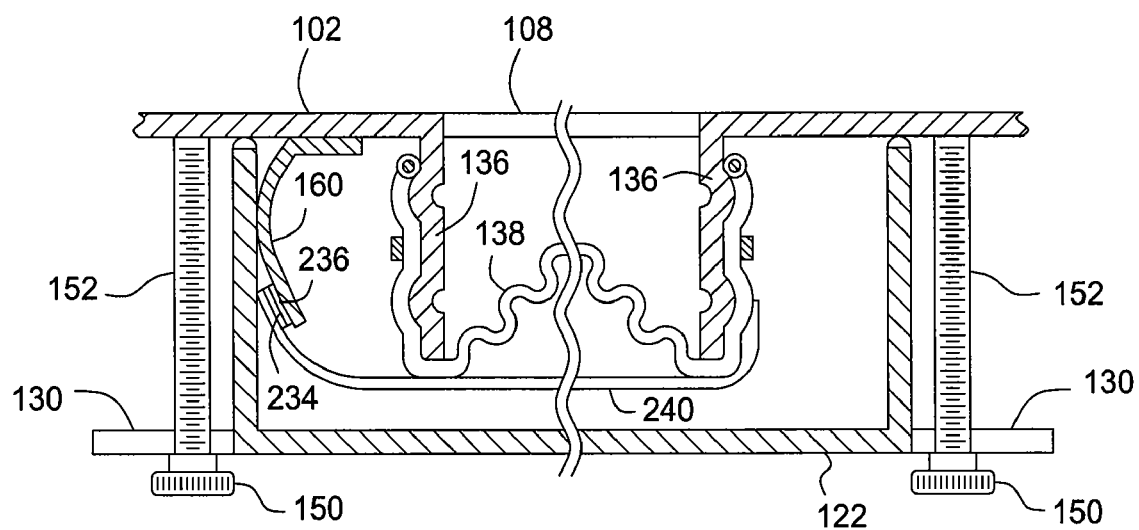
FIG. 3 is a partial sectional view of the contamination housing of FIG. 1 with a door installed over the bagging ring.

For example, and as shown in the embodiment depicted in FIG. 2, the indicator 160 is biased to the first position where the indicator 160 prevents proper engagement of the door 122 to the housing 102. In the embodiment depicted in FIG. 2, the indicator 160 rests against the stud 152. By securing the strap 240 to the indicator 160, the indicator 160 is retained in a position clear of the door 122 and door clamping mechanisms, thereby allowing the door 122 to be fastened to the housing 102 as depicted in FIG. 3.

Figure 4:
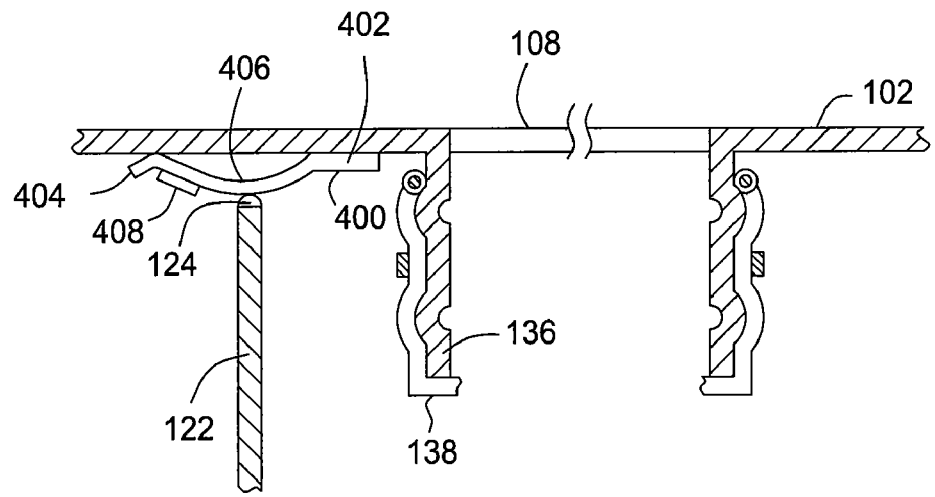
FIG. 4 is a partial sectional view of another embodiment of a contamination housing detailing a bagging ring to bag interface.

FIG. 4 is a partial sectional view of a housing 102 having another embodiment of an indicator 400. The indicator 400 is coupled to the housing 102 just outward of the bagging ring 136. The indicator 400 may be fabricated from materials as discussed relative to the indicator 160 discussed above. The indicator 400 has a first end 402 coupled to the housing 102 and a second end 404 biased away from the ring 136 to a first position that is outward of the seal 124 of the door 122. The indicator 400 may also include a rib 406 that, when the second end 404 of the indicator 400 is touching the housing 102, maintains the door 122 in a spaced-apart relation to the housing 102 such that it is evident that the door 122 has not seated properly against the housing 102.

Figure 5:
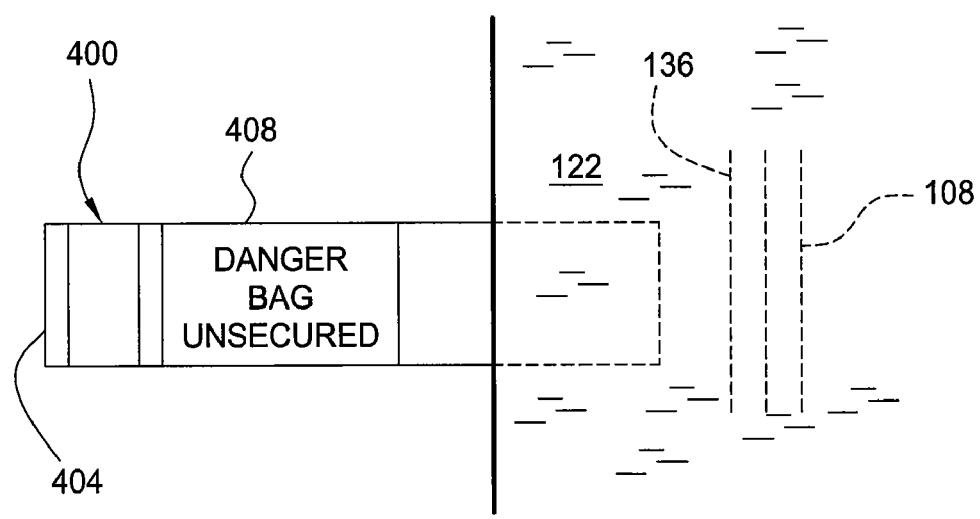
FIG. 5 is a side view of one embodiment of a bag indicator of the housing of FIG. 4 extending beyond a partially mounted door.
Figure 6:
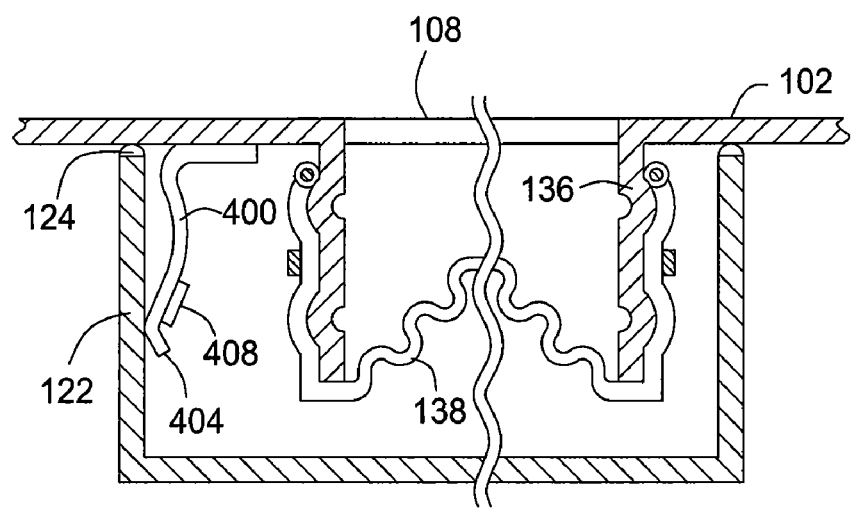
FIG. 6 is a partial sectional view of the contamination housing of FIG. 4 with the door installed over the bagging ring.

The second end 404 of the indicator 400 may also include a message 408. The message 408 may be printed, adhered or be otherwise visible on the indicator 400. The message 408 is positioned on the indicator 400 in an orientation visible from the exterior of the housing 102, particularly when the indicator 400 (biased to the first position) is substantially covered by the door 122, as additionally shown in FIG. 5. The message 408 generally includes a warning that the bag 138 may not be properly installed on the bagging ring 136. Thus, the technician installing the door 122, upon confirmation that the bag 138 is present on the bagging ring 136, manually urges the indicator 400 behind the door 122 such that the door 122 may be properly engaged with the housing 102, as depicted in FIG. 6.

Figure 7:
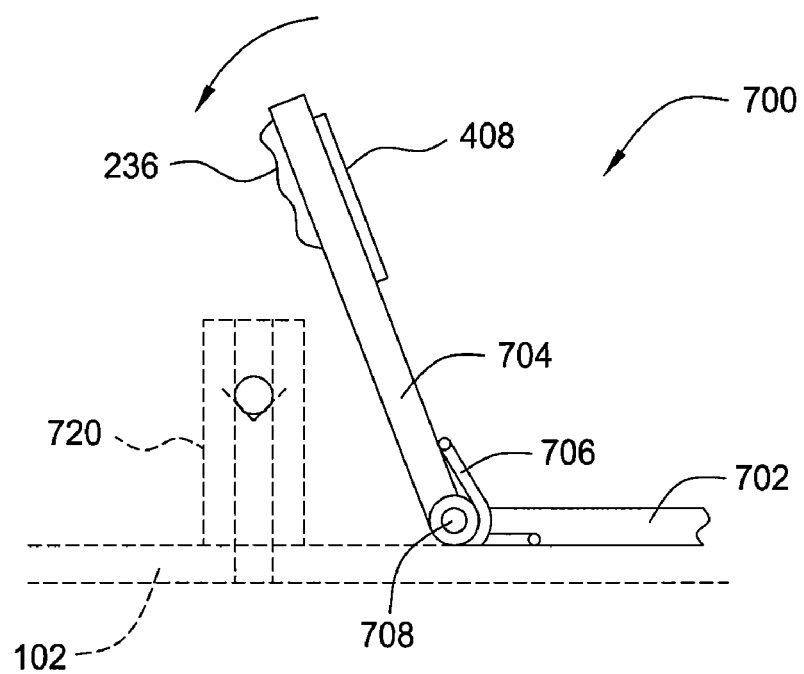
FIG. 7 is a side view of another embodiment of a bag indicator.

FIG. 7 is a side view of another embodiment of an indicator 700. The indicator 700 includes a first portion 702 and a second portion 704 coupled by a hinge 708. The indicator 700 includes a torsion spring 706 which biases the second portion 704 away from the bagging ring 136. The second portion 704 may include a message 408 and/or an engagement feature 236 for interfacing with a strap not shown. The second portion 704 of the indicator 700 is biased against a sample port 710 or other object on the outside of the housing 102.

Figure 8:
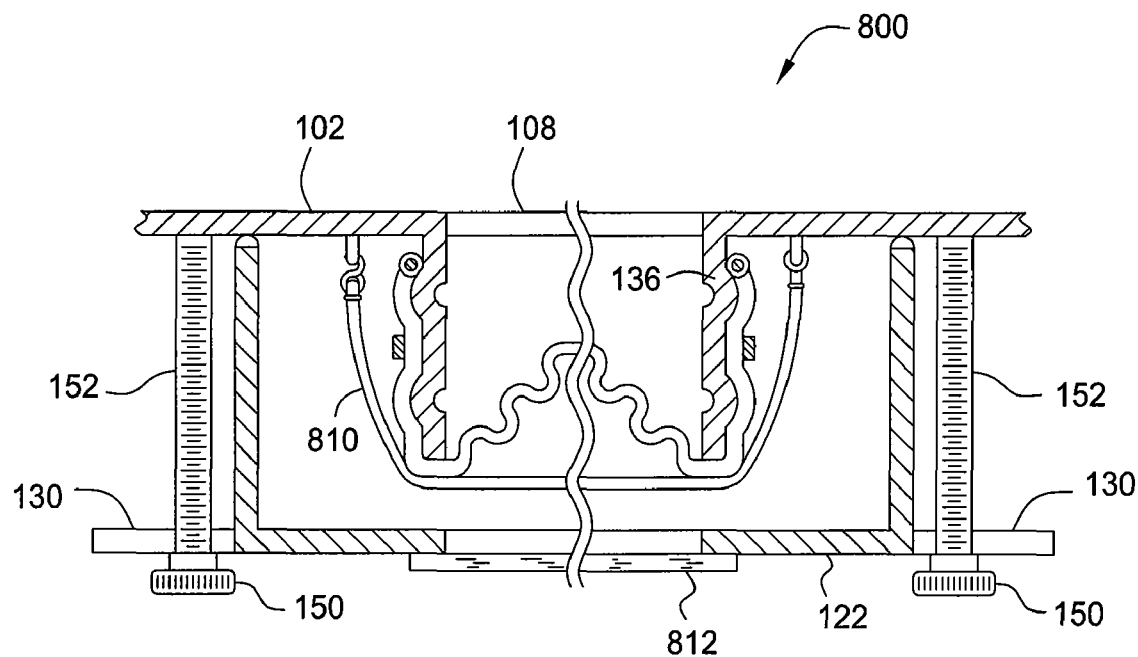
FIG. 8 is a partial sectional view of another embodiment of a contamination housing with a door installed over a bagging ring.

FIG. 8 is a partial sectional view of another housing assembly 800. The housing assembly 800 includes a body 102 having a bagging ring 136 circumscribing an access port 108, as discussed above. In the embodiment depicted in FIG. 8, an indicator 810 is utilized to retain the folded center section of the bag 138 in the aperture defined by the bagging ring 136. The indicator 810 may be a strap or an elastic cord coupled to the housing 102. The indicator 810 may be moved between a first position clear of the aperture 108 for allowing bag removal and replacement, and a second position retaining the bag within the aperture 108, as shown in FIG. 8. In one embodiment, the indicator 810 may be stretched into the first position, and in another embodiment, one end of the indicator 810 may be unhooked or unfastened from the housing 102. The indicator 810 may be utilized with an indicator 400 as described with reference to FIG. 4.

Figure 9:
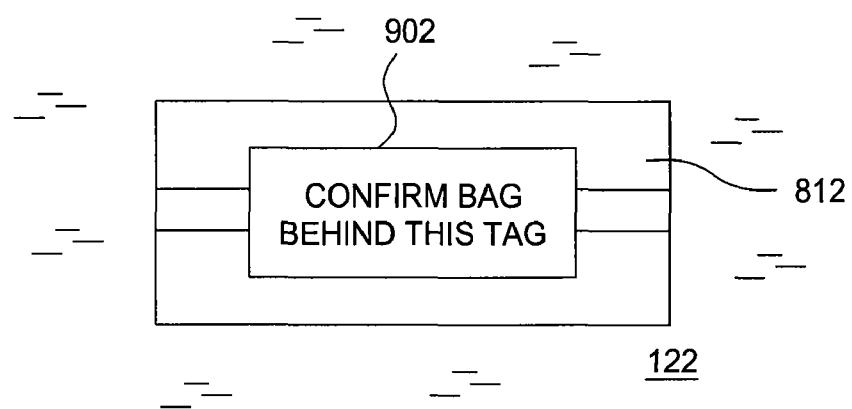
FIG. 9 is a side view of another embodiment of a bag indicator.

In the embodiment depicted in FIG. 8, the indicator 810 is visible through a window 812 sealingly coupled to the door 122. The indicator 810 may include a message 902 which is visible through the window 812 when the indicator 810 is positioned in the second position over the bag 138, as depicted in FIG. 9. The message 902 may include text indicating that the operator should confirm that the bag is in place prior to opening the door 122.

It is also contemplating that visual confirmation that the bag 138 is present on the bagging ring 136 may be made through the window 812 without the indicator 810 being positioned over the bag 138. In such an embodiment, the window 812 functions as the indicator.

Figure 10:
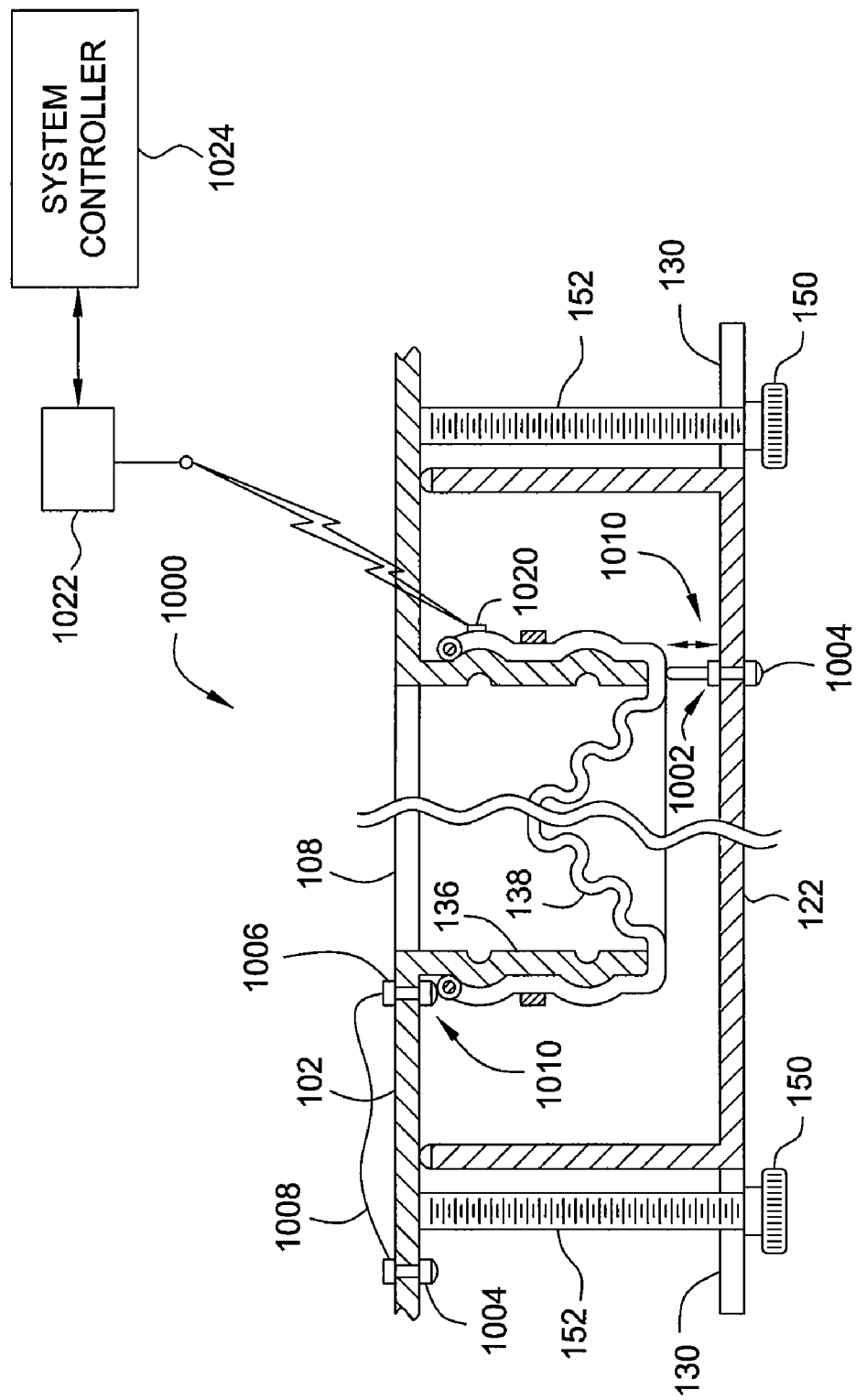
FIG. 10 is a partial sectional view of another embodiment of a contamination housing with a door installed over a bagging ring.

FIG. 10 is a partial sectional view of another housing assembly 1000. The housing assembly 1000 includes a body 102 having a bagging ring 136 circumscribing and access port 108, as discussed above. In the embodiment depicted in FIG. 8, an indicator 1010 may be utilized to detect the presence of the bag 138. The indicator 1010 may be a sensor suitable for detecting the presence of the bag 138, such as a linear displacement transducer, capacitance sensor, optical sensor, camera, limit switch or other sensor suitable for detecting a metric indicative of the position of the bag within the aperture 108 of the housing 102.

In one embodiment, the indicator 1010 is coupled to the door 122 and includes a sensor 1002, shown as an LVDT, which changes the state of an indication display 1004 visible on the exterior of the door 122. In another embodiment, the indicator 1010 includes a sensor 1006 coupled to the housing 102 or other suitable location that senses the bag 138 on the ring 136. The sensor 1006 is coupled by a lead 1008 to an indication display 1004 visible on the exterior of the housing 102. Failure to sense the presence of the bag may cause the system to lock-out the operation of the system or to generate a flag. The flag may be an audio, visual and/or electronic signal made to alert the system or operator of the missing bag.

In yet another embodiment, the bag 138 includes a tag 1020 that is read upon installation to the housing 102. The tag 1020 may be a bar code, RF transponder, memory device, digital storage, coding device, serial number or other proximity indicating device that actively or passively allows for the sensing of the presence of the bag 138.

The tag 1020 may include information such as bag type or model, lot or batch information, historical use information, thickness, material, unique identification code and the like. Historical use information may include manufacturing history, use history, type of materials entrained in the system in which the bag was installed, type of filter disposed in the bag, date of bag installation and/or removal from a contamination housing, and among others.

In another embodiment, the tag 1020 is a computer readable and/or writeable chip that can be remotely read and/or written by a computer based controller, such as the controller utilized to control the air movement within the contamination housing. In embodiments where the tag 1020 is a RF transponder, the presence of the tag 1020, and thus, the presence of the bag 138, may be sensed by a reader 1022. The reader 1022 may communicate with a system controller 1024, which in one embodiment will prevent operation of the housing 102, for example, by not allowing the air movers to be started and/or locking the dampers isolating the housing 102. The failure to sense the tag 1020 may also prompt generation of a flag. It is also contemplated the tag 1020 may include memory and/or be writable (for example an RF or magnetic read/writable tag) such that information regarding the system in which the bag was installed, optionally along with the operating conditions and exposure of the filter or other hazard information, may be written to the tag so that hazardous waste tracking and/or hazard information is available to persons handling the bag once the bag is removed from the system. It is also contemplated that such a tag 1020 may be coupled to the filter 112 (shown in FIG. 1) as well.

Figure 11:
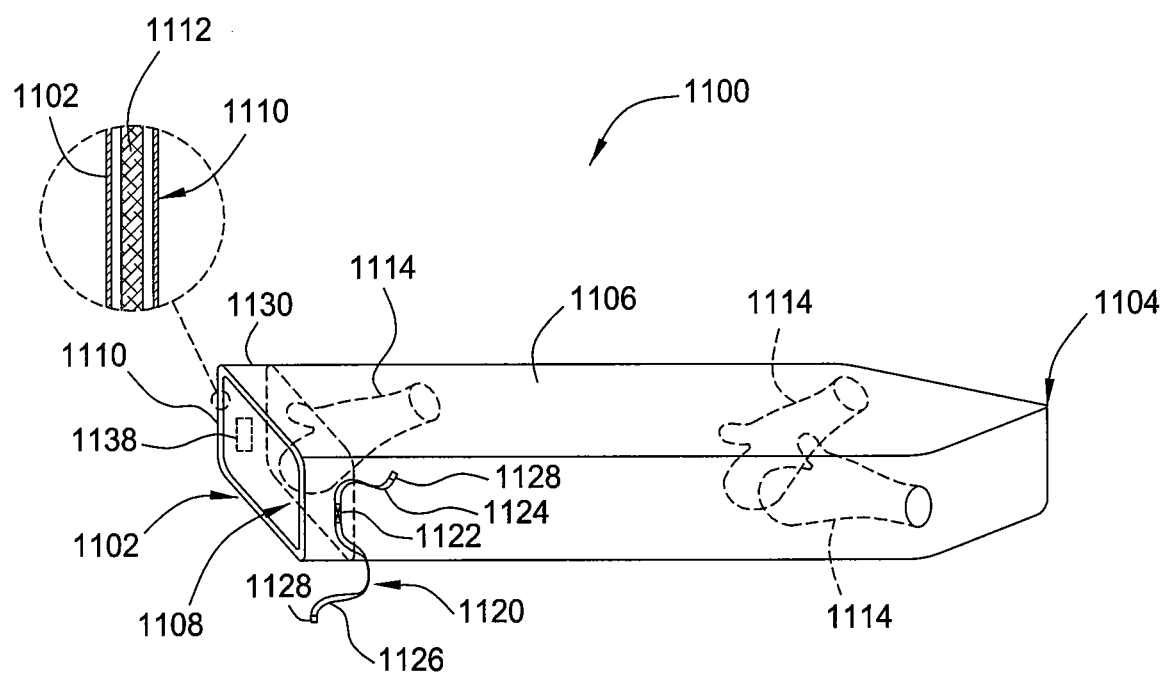
FIG. 11 is one embodiment of a filter change-out bag.

FIG. 11 is another embodiment of a filter change-out bag 1100. The bag 1100 and the bag 138 generally share the same constructions and physical attributes. The bag 1100 includes a tubular bag body 1106 having an open first end 1102 and a closed second end 1104. The body 1106 is generally fabricated from a translucent material, such as PVC, having an operational temperature between about minus 18 degrees Celsius to about ±65.5 degrees Celsius. The body 1106 is generally fabricated from a material that does not "stick together" after being in contact with itself for long periods of time. Some suitable bag materials include polyethylene, polyvinyl chloride, polypropylene, high-density polyethylene (HDPE), low density polyethylene (LDPE), Mylar and Teflon, among others. In one embodiment, the body 1106 may be fabricated to Federal Specification LP-375C, ERDA 76-21 (Section 6.2.3) or other suitable standard.

The first end 1102 has an aperture 1108 of sufficient size to fit over a predefined bagging ring, as discussed above. A portion 1130 of the body 1106 proximate the first end 1102 may be transparent thereby providing a window to allow the technician to see the filter being removed from the housing. The first end 1102 includes a hem 1110 that retains an elastic chord 1112. The elastic chord 1112 interfaces with the bagging ring of the housing to retain the bag.

At least one glove 1114 is coupled integrally to the bag 1100 to allow the technician to handle the filter within the bag. In the embodiment depicted in FIG. 11, two gloves 1114 are provided proximate the closed second end 1104 of the body 1106, while a single glove 1114 is provided proximate the open first end 1102 of the body 1106.

A strap 1120 is coupled to the bag 1100 to secure the bag within the aperture of the bagging ring as described above with reference to the bag 138. The strap 1120 has sufficient length to span the aperture of the bagging ring so that the bag can be effectively retained the bag within the aperture. It is contemplated that two or more straps may be utilized to perform this function. In the embodiment depicted in FIG. 11, the strap 1120 is coupled at a mounting strip 1122 to the body 1106 such that two strap portions 1124, 1126. The mounting strip 1122 to body 1106 attachment is generally made in a manner that retains the contamination barrier integrity of the bag 1100.

Each of the strap portions 1124, 1126 have a distal end configured to allow attachment of the strap 1120 to the contamination housing. In one embodiment, each end of the strap portions 1124, 1126 includes one portion of a hoop and loop fastener, shown in FIG. 11 are reference numeral 1128. In one embodiment, at least one of the strap portions 1124, 1126 is at least 10 inches in length, for example, about 4 inches for the first strap portions 1124 and about 12 inches for the second strap portion 1126.

Thus, a housing assembly has been provided that provides an indication of the presence of a bag in a contamination housing assembly. Importantly, the indication of the presence of a bag provides increased measure of safety against accidental exposure to hazardous materials. Additionally, although the invention has been illustrated using a housing assembly containing a filter, it is contemplated that the bag indicating features may be advantageously utilized in other contamination housings, for example, scan test housings coupled adjacent to a filter disposed in a ductwork, or other application where bags, covered by doors when not in use, are utilized to provide a barrier between technicians and hazardous areas.

Although various embodiments which incorporate the teachings of the present invention have been shown and described in detail herein, those skilled in the art can readily devise many other varied embodiment that still incorporate these teachings.

What is claimed is:

1. A bag/in bag/out filter change-out bag, comprising:
    a bag body having an open end and a closed end, the bag fabricated from a polymer material and having a contamination barrier integrity suitable for removing and replacing filters from a contamination housing assembly, the contamination housing assembly suitable for filtering hazardous airborne materials;
    an elastic cord coupled to and circumscribing the open end of the bag body;
    at least one glove coupled to the bag body; and
    a strap coupled to the exterior of the bag, the bag body, elastic cord, glove, and strap comprising a unitary bag/in bag/out filter change-out bag having a contamination barrier integrity.

2. The filter change-out bag of claim 1, wherein the strap further comprises:
    a first side of a hook and loop fastener coupled to the strap.

3. The filter change-out bag of claim 2, wherein the bag body further comprises:
    a second side of the hook and loop fastener coupled to the bag body.

4. The filter change-out bag of claim 1, wherein the strap further comprises:
    a warning message.

5. The filter change-out bag of claim 1, wherein the strap further comprises:
    a mounting portion coupled to the bag;
    a first portion extending from the mounting portion to a first distal end; and
    a second portion extending from the mounting portion to a second distal end.

6. The filter change-out bag of claim 1, wherein the strap further comprises:
    a first end coupled to the bag; and
    a second end configured to secure a position of the strap across a filter access port of a contamination housing.

7. The filter change-out bag of claim 6, wherein the second end further comprises:
    at least one of a hook or loop.

8. The filter change-out bag of claim 1 further comprising:
    a bag presence indicator.

9. The filter change-out bag of claim 8, wherein the bag presence indicator further comprises:
    an optical and/or RF readable tag.

10. The filter change-out bag of claim 1 further comprising:
    a digital storage device.

11. The filter change-out bag of claim 10, wherein the digital storage device is wirelessly writable.

12. A bag/in bag/out filter change-out bag for use with containment housings, comprising:
    a polymer bag having an open end configured to engage with a bagging ring of a containment housing, the polymer bag having a contamination barrier integrity suitable for removing and replacing filters from a contamination housing assembly suitable for filtering hazardous airborne materials;
    at least one dove coupled to the polymer bag; and
    a strap coupled to the bag without compromising the contamination barrier integrity of the bag, wherein the strap has a first end permanently fixed to the bag and a second end loosely detached from the bag.

13. The bag of claim 12 further comprising:
    a RF readable tag coupled to the bag without compromising contamination barrier integrity of the bag.

14. The bag of claim 12, wherein the strap further comprises:
    a first side of a hook and loop fastener coupled to the strap.

15. The bag of claim 14, wherein the bag body further comprises:
    a second side of the hook and loop fastener coupled to the bag body.

16. The bag of claim 12, wherein the strap further comprises:
    a mounting portion coupled to the bag;
    a first portion extending from the mounting portion to a first distal end; and
    a second portion extending from the mounting portion to a second distal end, wherein the distal ends include a feature configured to secure the first and second portions.

17. The bag of claim 12, wherein the strap further comprises:
    at least one feature for securing an end of the strap to an attachment point.

18. A bag/in bag/out filter change-out bag for use with containment housings, comprising:
    a polymer bag having an open end configured to engage with a bagging ring of a containment housing, the bag having a contamination barrier integrity suitable for bag in/bag out filter exchange;
    at least one glove coupled to the polymer bag; and
    one or more straps, each of the one or more straps having a first end fixedly coupled to the bag without compromising contamination barrier integrity of the bag and a second end uncoupled from the bag, the one or more straps positioned and having sufficient length to span an aperture of the bagging ring and retain a center portion of the bag within the aperture of the bagging ring.

19. A bag/in bag/out filter change-out bag for use with containment housings, comprising:
    a polymer bag having an open end configured to engage with a bagging ring of a containment housing, the bag having a contamination barrier integrity suitable for removing and replacing filters from a contamination housing assembly, the contamination housing assembly suitable for filtering hazardous airborne materials;
    one or more straps fixedly coupled to the bag without compromising the contamination barrier integrity of the bag;

at least one glove coupled to the bag; and a bag presence indicator coupled to the bag without compromising contamination barrier integrity of the bag.

20. The filter change-out bag of claim 19, wherein the bag presence indicator further comprises:

an optical and/or RF readable tag.

21. The filter change-out of claim 19, wherein the bag presence indicator further comprises:

a digital storage device.

22. The filter change-out bag of claim 21, wherein the digital storage device is wirelessly writable.

23. The filter change-out bag of claim 1, wherein the at least one glove further comprises:

a first glove coupled to the bag body proximate to the open end of the bag body; and a second glove coupled to the bag body proximate to the closed end of the bag body.

24. The bag of claim 12, wherein:

the first end of the strap is sealingly coupled to the bag by at least one of a sealed stitch, bond, and sonic weld; and the second end of the strap is configured to secure a position of the strap across a filter access port of a contamination housing.

\* \* \* \* \*

UNITED STATES PATENT AND TRADEMARK OFFICE
CERTIFICATE OF CORRECTION

| | | |
|---|---|---|
| PATENT NO. | : 7,993,437 B2 | Page 1 of 1 |
| APPLICATION NO. | : 11/613635 | |
| DATED | : August 9, 2011 | |
| INVENTOR(S) | : Huza | |

It is certified that error appears in the above-identified patent and that said Letters Patent is hereby corrected as shown below:

In column 10, Line 14, delete "dove" and insert -- glove --, therefor.

In column 11, Line 7, delete "change-out" and insert -- bag --, therefor.

Signed and Sealed this
Fourth Day of October, 2011

David J. Kappos
*Director of the United States Patent and Trademark Office*